United States Patent Office 3,503,951
Patented Mar. 31, 1970

3,503,951
COMPLEXES OF A.C.T.H. PEPTIDES WITH POLY-GLUTAMIC AND POLYASPARTIC ACID
Beat Iselin, Riehen, and Leo Geller, Basel, Switzerland, assignors to Ciba Corporation, New York, N.Y., a corporation of Delaware
No Drawing. Filed Apr. 5, 1966, Ser. No. 540,188
Claims priority, application Switzerland, June 15, 1965, 8,313/65, 8,314/65; Mar. 25, 1966, 4,369/66
Int. Cl. C07c *103/52;* A61k *27/00*
U.S. Cl. 260—112.5                        8 Claims

ABSTRACT OF THE DISCLOSURE

Process for the manufacture of adrenocorticotropically active preparations containing peptides that have an adrenocorticotropic activity, or their salts or derivatives, in conjunction with polymers (preferably polyglutamic and polyaspartic acid polymers) or copolymers of amino acids containing a predominant share of acid α-amino acids and the products produced thereby (preferably copolymers of glutamic and aspartic acids). The products have significantly prolonged activity and good compatibility.

It is known that the adrenocorticotropic activity of peptides can be prolonged by converting the peptides into metal complexes, e.g., complexes with zinc hydroxide, zinc phosphate or zinc pyrophosphate. Certain corticotropin preparations have, however, the disadvantage that they produce allergies.

The present invention is based on the observation that the adrenocorticotropic activity of the peptides mentioned can be very significantly prolonged and at the same time their good compatibility ensured by converting the peptides into their complexes with polymers or copolymers of amino acids consisting predominantly of acid α-amino acids, such as glutamic acid or aspartic acid, of the L-, D- or D,L-configuration.

Accordingly, the present invention provides a process for the manufacture of adrenocotropically active preparations containing peptides that have an adrenocorticotropic activity, or their salts or derivatives, in conjunction with polymers or copolymers of amino acids containing a predominant share of acid α-amino acids.

Peptides which have an adrenocorticotropic activity are, for example the natural ACTH ($\beta^{1-39}$-corticotropin) itself and peptides having a shorter amino acid chain than $\beta^{1-39}$-corticotropin. It is known that amino acids up to the 16th amino acid can be split off from the carboxyl end of natural ACTH without the ACTH activity being completely lost. Furthermore, individual amino acids can be replaced by others. Thus, for example the serine radicals serine[1] and/or serine[3] can be replaced by glycine or alanine; tyrosine[2] can be replaced by phenylalanine; methionine[4] can be replaced by norvaline, leucine or α-aminobutyric acid, glutamic acid[5] by glutamine, or arginine[17,18] by ornithine or lysine. The first amino acid, serine[1], can also be replaced by proline, threonine or other amino acids, or it may be absent, or further amino acid radicals may precede it. Particularly suitable for the preparations of the present invention are peptides that contain an amino acid chain of at least 17, for instance 19 to 28, preferably 20 to 25, especially 24, amino acids reckoned from the amino end of β-corticotropin, and they may also comprise a different amino acid composition, especially one or several of the amino acids 1–5, 17 and 18 may be different from those of the ACTH-sequence.

Salts of the adrenocorticotropically active peptides are especially acid addition salts of therapeutically acceptable acids such as hydrochloric, acetic, sulfuric, phosphoric or sulfonic acids.

The derivatives concerned are primarily amides, especially the C-terminal unsubstituted amide.

The polymers and copolymers of acid amino acids consist in the first place of glutamic acid and/or aspartic acid and possibly further α-amino acids such as glycine, valine or leucine. They have free carboxyl groups in their side chain. Their terminal carboxyl group can be present as a free or a functionally modified carboxyl group, e.g., an ester group or an unsubstituted amide group or an amide group substituted, e.g., by hydrocarbon radicals, above all by lower alkyls. The units of the polymers may display the L-, D- or D,L-configuration. The molecular weight of the polymers may be within the range from 1000 to 100,000 and is for example 5000–50,000, preferably from 10,000 to 40,000. The preparations are advantageously manufactured from a water-soluble, physiologically acceptable salt, e.g., the sodium or ammonium salt or a salt with an organic base such as triethylamine, procain, dibenzylamine or other tertiary nitrogen bases.

The polymers are known or can be prepared by known methods, for example by the process described by M. Idelson et al. in J. Am. Chem. Soc. 80, pages 4631 et seq. [1958]. Thus, for example, glutamic acid-α-carboxyanhydride-γ-benzyl ester or -tertiary butyl ester can be reacted in dioxane with ammonia or with an amine at a certain molecular ratio e.g. 100:1 (depending on the desired degree of polymerization), and on completed polymerization the protective groups are eliminated, e.g., the benzyloxy group with hydrogen bromide in glacial acetic acid, or the tertiary butyloxy group with trifluoroacetic acid. For manufacturing polymers having a uniform, definite chain length the polymers may also be synthesized by the processes known from peptide chemistry, such as the carbodiimide method, the azide method or the like.

The preparations may be administered intramuscularly or intravenously. The preparations are formulated in known manner by mixing an aqueous solution of the salt of the polymer with the adrenocorticotropically active peptide or its salts or derivatives and, if desired or required, with further ingredients. If it is desired to add to the mixture a sparingly soluble metal salt or hydroxide, this is best done by adding to the mixture of peptide + polymer a suitable water-soluble metal salt, e.g., zinc chloride, zinc sulfate or zinc acetate, followed by addition of the amount required for precipitating the hydroxide or phosphate of a dissolved hydroxide or metal salt capable of precipitating the desired metal oxide or metal salt, such as an alkali metal hydroxide, alkali phosphate or the like.

The following examples illustrate the invention.

EXAMPLE 1

2.0 grams of poly-L-glutamic acid (average molecular weight about 11,000) are dissolved in about 5.7 ml. of sodium hydroxide solution of 10% strength to establish a pH of 7.4 in the solution. 5.0 mg. of $\beta^{1-24}$-corticotropin hexaacetate and 0.2 mg. of merthiolate are then dissolved in this solution and the whole is made up to 10 ml. with distilled water. The solution is filtered under sterile conditions. It contains per ml.:

$\beta^{1-24}$-corticotropin hexaacetate—0.5 mg.
Poly-L-glutamic acid—200.0 mg.
Sodium hydroxide solution to produce pH—7.4.
Merthiolate—0.02 mg.
Distilled water to make 1.0 ml.

EXAMPLE 2

2.0 grams of poly-L-glutamic acid (molecular weight about 11,000) are dissolved in about 5.7 ml. of sodium hydroxide solution of 10% strength to establish a pH of 7.4 in the solution. 5.0 mg. of $\beta^{1-24}$-corticotropin hexaacetate and 0.2 mg. of merthiolate are then dissolved in this solution, and 1 ml. of a hydrochloric solution of zinc chloride (pH 2.8) containing 5.2 mg. of zinc chloride per ml. are added. The pH is adjusted to 7.8 by means of sodium hydroxide solution, and the whole is made up with distilled water to a final volume of 10 ml.

EXAMPLE 3

2.0 grams of poly-L-glutamic acid (molecular weight about 11,000) are dissolved in about 5.7 ml. of sodium hydroxide solution of 10% strength to establish a pH of 7.4 in the solution. 5.0 mg. of $\beta^{1-24}$-corticotropin hexaacetate and 0.2 mg. of merthiolate are then dissolved in this solution, and 1 ml. of a hydrochloric solution (pH 2.8) containing 5.2 mg. of zinc chloride and 0.85 mg. of disodium phosphate (anhydrous) are added. The pH is adjusted to 7.8 with sodium hydroxide solution. The whole is made up with water to a volume of 10 ml.

EXAMPLE 4

5 mg. of poly-L-glutamic acid of an average molecular weight of 39,600 are dissolved in 5 ml. of 0.1 N sodium hydroxide solution. The solution is filtered, and a solution of 0.25 mg. of $\beta^{1-24}$-corticotropin hexaacetate added, the whole then acidified with acetic or hydrochloric acid to pH 4, and made up with water to 10 ml. A finely distributed poly-L-glutamic acid-$\beta^{1-24}$-corticotropin complex precipitates. The suspension contains, per ml., 0.5 mg. of poly-L-glutamic acid and 0.25 mg. of $\beta^{1-24}$-corticotropin as a complex compound.

EXAMPLE 5

In the manner described in Example 4, but with the use of a poly-L-glutamic acid having an average molecular weight of 11,000, a suspension is prepared which contains, per ml. 0.5 mg. of poly-L-glutamic acid and 0.25 mg. of $\beta^{1-24}$-corticotropin as complex.

EXAMPLE 6

In the manner described in Examples 1-5, preparations are made which contain as adrenocorticotropically active peptide $\beta^{1-17}$ - corticotropin, $\beta^{1-17}$-corticoptropin-Arg$^{17}$-amide, $\beta^{1-18}$ - corticotropin, $\beta^{1-18}$-corticoptropin-Arg$^{18}$-amide, $\beta^{1-19}$ - corticotropin, $\beta^{1-19}$corticotropin - pro$^{19}$-amide, Glu(NH$_2$)$^5$-$\beta^{1-19}$-corticotropin, $\beta^{1-20}$-corticotropin-Val$^{20}$-amide, $\alpha$-aminobutyryl$^4$-Glu(NH$_2$)$^5$ - $\beta^{1-20}$-corticotropin - Val$^{20}$ - amide, $\beta^{1-21}$-corticotropin, $\beta^{1-23}$-corticotropin - Tyr$^{23}$ - amide, Phe$^2$-$\beta^{1-23}$ - corticotropin - Tyr$^{23}$-amide, Ala$^3$ - $\beta^{1-23}$ - corticotropin - Tyr$^{23}$ - amide, Gly$^1$-$\beta^{1-23}$-corticotropin - Tyr$^{23}$-amide, $\beta^{2-23}$ - corticotropin-Tyr$^{23}$ - amide, Glu(NH$_2$)$^5$-$\beta^{1-24}$ - corticotropin, Orn$^{17,18}$-$\beta^{1-24}$ - corticotropin, Lys$^{17,18}$-$\beta^{1-24}$-corticotropin, Norleu$^4$-$\beta^{1-24}$ - corticotropin, $\beta^{1-25}$ - corticotropin-Val$^{25}$ - amide, Norleu$^4$ - $\beta^{1-25}$ - corticotropin - Val$^{25}$ - amide, Norleu$^4$-Val$^{25}$-$\beta^{1-25}$ - corticotropin-Val$^{25}$ - amide, Norval$^4$-Val$^{25}$-$\beta^{1-25}$ - corticotropin - Val$^{25}$-amide, Norleu$^4$ - Lys$^{17,18}$-Val$^{25}$ - $\beta^{1-25}$ - corticotropin-Val$^{25}$ - amide, $\beta^{1-26}$-corticotropin, $\beta^{1-28}$ - corticotropin, $\beta^{1-30}$-corticotropin, $\beta^{1-31}$-corticotropin, $\beta^{1-39}$ - corticotropin, or Gly$^1$-$\beta^{1-39}$-corticotropin.

What is claimed is:

1. An adrenocorticotropically active complex of a member selected from the group consisting of (a) a $\beta^{1 \text{ to } n}$-corticotropin in which $n$ is an integer from 17 to 39, both inclusive, wherein the amino acid in the 1st position is a member selected from the group consisting of serine, glycine, alanine, proline, and threonine, the amino acid in the 2nd position is a member selected from the group consisting of tyrosine and phenylalanine, the amino acid in the 3rd position is a member selected from the group consisting of glycine, serine, and alanine, the amino acid in the 4th position is a member selected from the group consisting of methionine, norvaline, norleucine, leucine and $\alpha$-aminobutyric acid, the amino acid in the 5th position is a member selected from the group consisting of glutamic acid and glutamine, the amino acid in the 17th and 18th positions are members selected from the group consisting of arginine, ornithine, and lysine, and the amino acid in the 25th position is a member selected from the group consisting of aspartic acid and valine and (b) an N-unsubstituted C-terminal amide of a peptide as defined in (a), with a polymer selected from the group consisting of polyglutamic and polyaspartic acid, said polymer having a molecular weight of about 1000 to 100,000, and each of said optically active amino acids being of the L-configuration.

2. An adrenocorticotropically active complex of claim 1 in which the $\beta^{1 \text{ to } n}$-corticotropin is (a) an ACTH-active peptide having the sequence of at least 17 amino acids of natural ACTH counted from the N-terminus and (b) an N-unsubstituted C-terminal amide of a peptide as mentioned under (a).

3. An adrenocorticotropically active complex of claim 1 in which the $\beta^{1 \text{ to } n}$-corticotropin is a member selected from the group consisting of (a) an ACTH-active peptide having the sequence of at least 17 amino acids of natural ACTH counted from the N-terminus in which one or more of the amino acids in positions 1 to 5, 17, 18, and 25 of the natural corticotropin sequence is exchanged for other amino acids and (b) an N-unsubstituted C-terminal amide of a peptide as mentioned under (a).

4. An adrenocorticotropically active complex of claim 1 in which the $\beta^{1 \text{ to } n}$-corticotropin is a member selected from the group consisting of (a) an ACTH-active peptide having the sequence of 20 to 25 amino acids of natural ACTH counted from the N-terminus and (b) a peptide as mentioned under (a) in which one or more of the amino acids in positions 1 to 5, 17, 18, and 25 of the corticotropin sequence are exchanged for other natural $\alpha$-amino acids and (c) an N-unsubstituted C-terminal amide of a peptide as mentioned under (a) or (b).

5. An adrenocorticotropically active complex of claim 1 in which the $\beta^{1 \text{ to } n}$-corticotropin is a member selected from the group consisting of (a) an ACTH-active peptide have the sequence of 24 amino acids of natural ACTH counted from the N-terminus and (b) a peptide as mentioned under (a) in which one or more of the amino acids in positions 1 to 5, 17, and 18 of the natural corticotropin sequence are exchanged for other $\alpha$-amino acids and (c) an N-unsubstituted C-terminal amide of a peptide as mentioned under (a) or (b).

6. An adrenocorticotropically active complex of claim 1 which is a complex of $\beta^{1-24}$-corticotropin with an L-glutamic acid polymer having a molecular weight of about 1000 to 100,000.

7. An aqueous solution of an adrenocorticotropically active complex of claim 1.

8. An aqueous suspension of an adrenocorticotropically active complex of claim 1.

References Cited

UNITED STATES PATENTS

| 3,108,042 | 10/1963 | Murphy et al. | 167—58 |
| 3,192,114 | 6/1965 | Hogberg et al. | 167—74 |
| 3,228,839 | 1/1966 | Kappeler et al. | 167—77 |

FOREIGN PATENTS 668,250   2/1966   Belgium.

OTHER REFERENCES

Hedner, Acta Endocrin 43, 499–501 (1963).
Idelson et al., J. Am. Chem. Soc. 80, 4631–4634 (1958).

LEWIS GOTTS, Primary Examiner

M. M. KASSENOFF, Assistant Examiner

U.S. Cl. X.R.

424—177, 179

CASE 5711/5712/1+2

PO-1050
(5/69)

UNITED STATES PATENT OFFICE
CERTIFICATE OF CORRECTION

Patent No. 3,503,951                Dated March 31, 1970

Inventor(s) BEAT ISELIN ET AL

It is certified that error appears in the above-identified patent and that said Letters Patent are hereby corrected as shown below:

Column 4, line 35, before "cortico-" insert --- natural ---.

Column 4, line 36, after "other" delete "natural".

SIGNED AND
SEALED
MAR 9 1971

(SEAL)
Attest:

Edward M. Fletcher, Jr.
Attesting Officer

WILLIAM E. SCHUYLER, JR.
Commissioner of Patents